(12) United States Patent
Chen et al.

(10) Patent No.: US 6,792,349 B1
(45) Date of Patent: Sep. 14, 2004

(54) VEHICLE NAVIGATION SYSTEM AND METHOD

(75) Inventors: Kuo-Rong Chen, Panchiao (TW); Chun-Chung Lee, Taipei (TW); Cheng-Hung Huang, Miaoli (TW)

(73) Assignee: Sin Etke Technology Co., Ltd., Taipei (TW)

( * ) Notice: Subject to any disclaimer, the term of this patent is extended or adjusted under 35 U.S.C. 154(b) by 0 days.

(21) Appl. No.: 10/628,359

(22) Filed: Jul. 29, 2003

(30) Foreign Application Priority Data

May 2, 2003 (TW) .................................... 92112127 A

(51) Int. Cl.⁷ .............................................. G01C 21/00
(52) U.S. Cl. ...................... 701/202; 701/201; 340/995
(58) Field of Search ............................... 701/202, 201, 701/209, 214; 340/990, 995, 988

(56) References Cited

U.S. PATENT DOCUMENTS 5,513,110 A * 4/1996 Fujita et al. ................ 701/207
6,151,375 A * 11/2000 Nakatsugawa ............... 375/370

* cited by examiner

Primary Examiner—Marthe Y. Marc-Coleman
(74) Attorney, Agent, or Firm—Bacon & Thomas PLLC

(57) ABSTRACT

A remote consumer service center calculates traveling routes for a car and selects a geo area that covers the traveling routes. The geo area is defined by two boundary points, and divided by a pair of 2D grid number into multiple geo zones each respectively defined with a pair of 2D index. The remote consumer service center sends the boundary points, the pair of 2D grid number, and multiple pairs of 2D indexes of traveling zones corresponding to the traveling routes to an On-Board Unit of the car wirelessly. The On-Board Unit rebuilds a 2D grillwork according to the boundary points and the pair of 2D grid number, and then displays on a display together with multiple traveling grids and a current grid, enabling the driver to find the forward direction himself. The remote consumer service center can synchronously display a monitoring 2D grillwork to guide the car moving.

18 Claims, 10 Drawing Sheets

FIG. 4

| | | | | | | | | | | | | Pe2(Xe2, Ye2) |
|---|---|---|---|---|---|---|---|---|---|---|---|---|
| $A_{C9}$ | $A_{B9}$ | $A_{A9}$ | $A_{99}$ | $A_{89}$ | $A_{79}$ | $A_{69}$ | $A_{59}$ | $A_{49}$ | $A_{39}$ | $A_{29}$ | $A_{19}$ | $A_{09}$ |
| $A_{C8}$ | $A_{B8}$ | $A_{A8}$ | $A_{98}$ | $A_{88}$ | $A_{78}$ | $A_{68}$ | $A_{58}$ | $A_{48}$ | $A_{38}$ | $A_{28}$ | $A_{18}$ | $A_{08}$ |
| $A_{C7}$ | $A_{B7}$ | $A_{A7}$ | $A_{97}$ | $A_{87}$ | $A_{77}$ | $A_{67}$ | $A_{57}$ | $A_{47}$ | $A_{37}$ | $A_{27}$ | $A_{17}$ | $A_{07}$ |
| $A_{C6}$ | $A_{B6}$ | $A_{A6}$ | $A_{96}$ | $A_{86}$ | $A_{76}$ | $A_{66}$ | $A_{56}$ | $A_{46}$ | $A_{36}$ | $A_{26}$ | $A_{16}$ | $A_{06}$ |
| $A_{C5}$ | $A_{B5}$ | $A_{A5}$ | $A_{95}$ | $A_{85}$ | $A_{75}$ | $A_{65}$ | $A_{55}$ | $A_{45}$ | $A_{35}$ | $A_{25}$ | $A_{15}$ | $A_{05}$ |
| $A_{C4}$ | $A_{B4}$ | $A_{A4}$ | $A_{94}$ | $A_{84}$ | $A_{74}$ | $A_{64}$ | $A_{54}$ | $A_{44}$ | $A_{34}$ | $A_{24}$ | $A_{14}$ | $A_{04}$ |
| $A_{C3}$ | $A_{B3}$ | $A_{A3}$ | $A_{93}$ | $A_{83}$ | $A_{73}$ | $A_{63}$ | $A_{53}$ | $A_{43}$ | $A_{33}$ | $A_{23}$ | $A_{13}$ | $A_{03}$ |
| $A_{C2}$ | $A_{B2}$ | $A_{A2}$ | $A_{92}$ | $A_{82}$ | $A_{72}$ | $A_{62}$ | $A_{52}$ | $A_{42}$ | $A_{32}$ | $A_{22}$ | $A_{12}$ | $A_{02}$ |
| $A_{C1}$ | $A_{B1}$ | $A_{A1}$ | $A_{91}$ | $A_{81}$ | $A_{71}$ | $A_{61}$ | $A_{51}$ | $A_{41}$ | $A_{31}$ | $A_{21}$ | $A_{11}$ | $A_{01}$ |
| $A_{C0}$ | $A_{B0}$ | $A_{A0}$ | $A_{90}$ | $A_{80}$ | $A_{70}$ | $A_{60}$ | $A_{50}$ | $A_{40}$ | $A_{30}$ | $A_{20}$ | $A_{10}$ | $A_{00}$ |

VEHICLE NAVIGATION SYSTEM AND METHOD

BACKGROUND OF THE INVENTION

1. Field of the Invention

The present invention relates to motor vehicle navigation technology and, more particularly, to a vehicle navigation system and method that provide a simple navigation way for a car driver to forward to the destination.

2. Description of Related Art

Conventional motor vehicle navigation systems are to provide each motor vehicle with a huge electronic map database and a well-equipped On-Board Unit, enabling the well-equipped On-Board Unit of each motor vehicle to calculate the optimal route to the destination itself. Because each motor vehicle must be equipped with such a huge electronic map database and such an expensive On-Board Unit, the cost is high, and much vehicle installation space is required.

U.S. Pat. No. 6,292,743 and U.S. Pat. No. 6,314,369 disclose a navigation technology, which uses a remote server to calculate the optimal route for a car and sends the calculated information to the motor vehicle's On-Board Unit wirelessly. The information to be sent to the motor vehicle's On-Board Unit according to the conventional navigation methods include the geographical longitude/latitude (or even altitude) coordinates of all turning points of the optimal route. Because the calculated geographical longitude/latitude (or even altitude) coordinates must be further processed through a complicated calculating procedure to convert degree/minute/second data into second data and then to let converted second data be sent to the motor vehicle's On-Board Unit wirelessly by a remote server, the amount of wirelessly transmitting data is huge which resulting in high error rate. Further, upon receipt of the converted second data, the motor vehicle's On-Board Unit must frequently converts the currently received degree/minute/second data of GPS coordinates into second data every two to five seconds so as to compare with the optimal route's second data. Therefore, the loading of converting procedure of the frequent GPS coordinates in the On-Board Unit is very heavy and time-consuming. In order to achieve the aforesaid complicated calculating and comparing procedure, the conventional On-Board Unit must still remain a powerful function which resulting in high cost.

Therefore, it is desirable to provide a vehicle navigation system that eliminates the aforesaid drawbacks.

SUMMARY OF THE INVENTION

It is the object of the present invention to provide a vehicle navigation system and method, which simplifies the On-Board Unit of a car to lower the cost. It is another object of the present invention to provide a vehicle navigation system and method, which reduces the wireless transmitting amount and improves wireless transmitting accuracy. It is further another object of the present invention to provide a vehicle navigation system and method, which enables the consumer service center to provide an on-line navigating service when the car got lost.

According to one aspect of the present invention, the vehicle navigation method is used in a remote consumer service center, comprising the steps in series of:

(A) receiving the position data of a starting point and the position data of a destination point;

(B) searching at least one traveling route from the starting point to the destination point;

(C) selecting a geo area covering the at least one traveling route, in which the geo area is defined by at least two position parameters and divided into a plurality of geo zones subject to a pair of predetermined 2D (two-dimensional) grid number, the geo zones each being respectively defined with a respective pair of 2D (two-dimensional) index subject to a 2D (two-dimensional) array rule;

(D) searching multiple traveling zones corresponding to the geo zones which including the at least one traveling route therein;

(E) establishing a simple navigation information, the simple navigation information comprising the at least two position parameters, the pair of predetermined 2D grid number, and the pairs of 2D indexes of the traveling zones; and (F) transmitting the simple navigation information to a car, The serviceman of the remote consumer service center can achieve the aforesaid step by step manually. Preferably, the remote consumer service center provides a server and an electronic map database to execute the above steps in series automatically, achieving a rapid and accurate effect. Further, a memory may be installed in the remote consumer service center to store the simple navigation information, so that a monitoring 2D grillwork, a current grid corresponding to the 2D grid of the current position of the car, and all the traveling grids having their pairs of 2D indexes same with those of said traveling zones can be displayed on a display. Therefore, the serviceman of the remote consumer service center can provide an on-line navigating service later through a wireless communication device (for example, GPRS module, GSM module, 3C module, or any of a variety of other equivalent wireless communication modules) to the On-Board Unit (OBU) of the car to guide the car moving forward synchronically when the car got lost.

According to another aspect of the present invention, the vehicle navigation system is installed in a car, comprising a GPS (global positioning system) module, a memory, a processor, and an output device. The aforesaid simple navigation information is preferably received by a wireless communication device in the car and then is stored in the memory. The processor reads the at least two position parameters of the simple navigation information from the memory, defines a 2D (two-dimensional) grillwork by means of the at least two position parameters, reads the pair of predetermined 2D grid number from the memory and divides the 2D grillwork into a plurality of 2D (two-dimensional) grids each having a respective reference point position and a respective pair of 2D index defined subject to a 2D (two-dimensional) array rule, fetches the current position data of the car from the GPS module, and compares the current position data of the car to the reference point positions of the 2D grids so as to calculate the pair of 2D index of a current grid corresponding to the current position of the car. The processor also controls the output device to display the 2D grillwork, the current grid, and a plurality of traveling grids having their pairs of 2D indexes same with the pairs of 2D indexes stored in the memory.

Therefore, the processor of the On-Board Unit simply needs to renew and display the current grid of the current position of the car on the output device, for enabling the car driver to compare with all the traveling grids by himself to find the forwarding direction himself. Because the processor of the present invention needs neither to convert longitude/latitude coordinates data into seconds nor to calculate the next direction to the traveling route, the On-Board Unit is simplified, and the cost of the On-Board Unit is greatly lowered. Further, because the consumer service center needs not to convert the complicated longitude/latitude coordinates into second data, the wireless data transmission amount is greatly reduced and the higher accuracy of wireless data transmission is achieved, and the consumer service center can synchronously display a monitoring 2D grillwork to synchronously provide an on-line navigating service when the car got lost.

Other objects, advantages, and novel features of the invention will become more apparent from the following detailed description when taken in conjunction with the accompanying drawings.

BRIEF DESCRIPTION OF THE DRAWINGS

FIG. 4 is a 2D matrix array rule of multiple pairs of 2D indexes of geo zones according to the present invention.

FIG. 8 is a schematic drawing showing the relationship of the current grid and the traveling grids.

DETAILED DESCRIPTION OF THE PREFERRED EMBODIMENT

Figure 1:
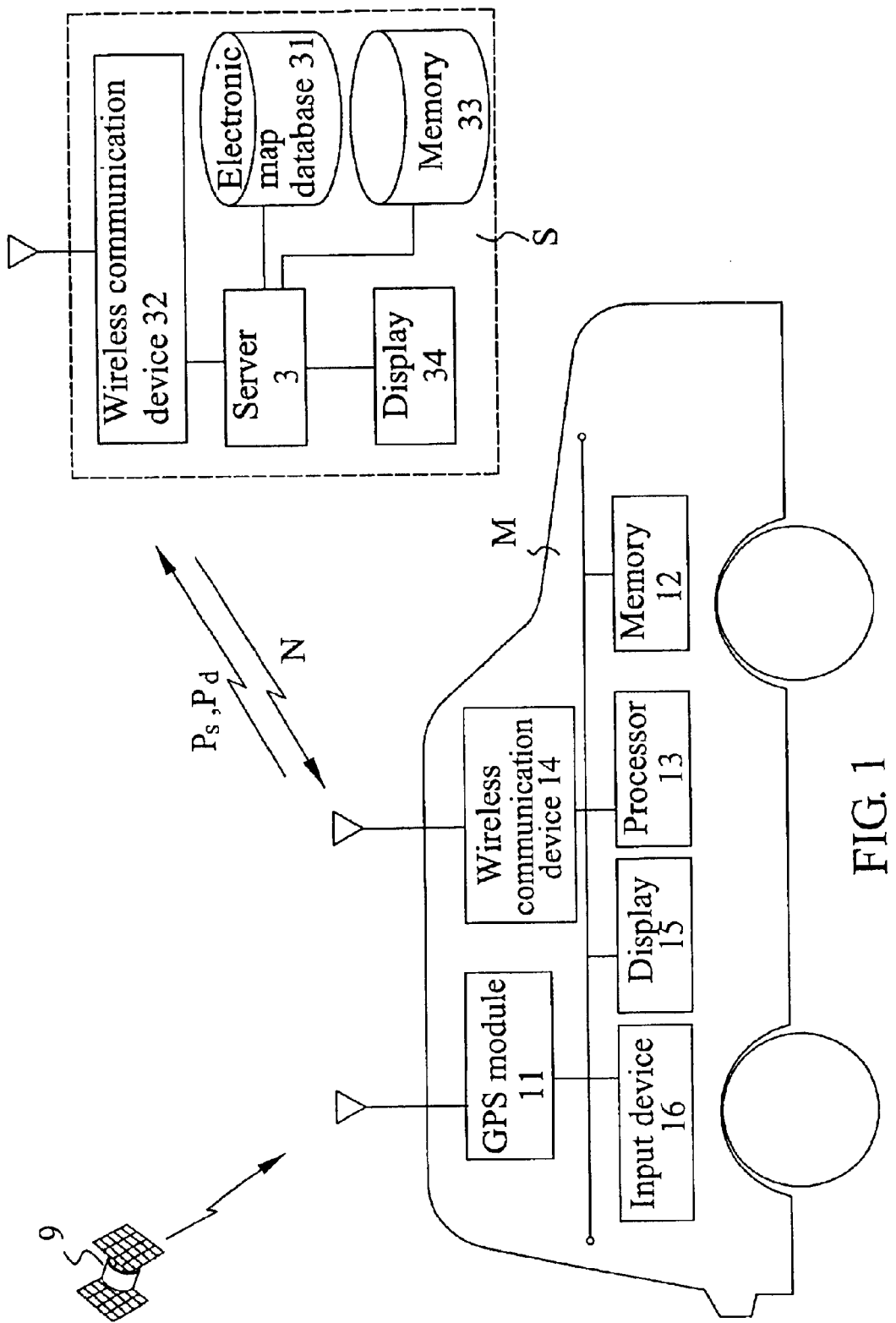
FIG. 1 is a system block diagram of the preferred embodiment of the present invention.

With reference to FIG. 1, a remote consumer service center S is provided having installed therein a server 3, which has linked thereto an electronic map database 31, a wireless communication device 32, a memory 33, and a display 34. FIG. 1 also shows that the car M has installed therein a processor 13 for a simple computing operation, without any conventional precision navigator or electronic map database in the car M, to save the OBU (On-Board Unit) installation cost.

Figure 2:
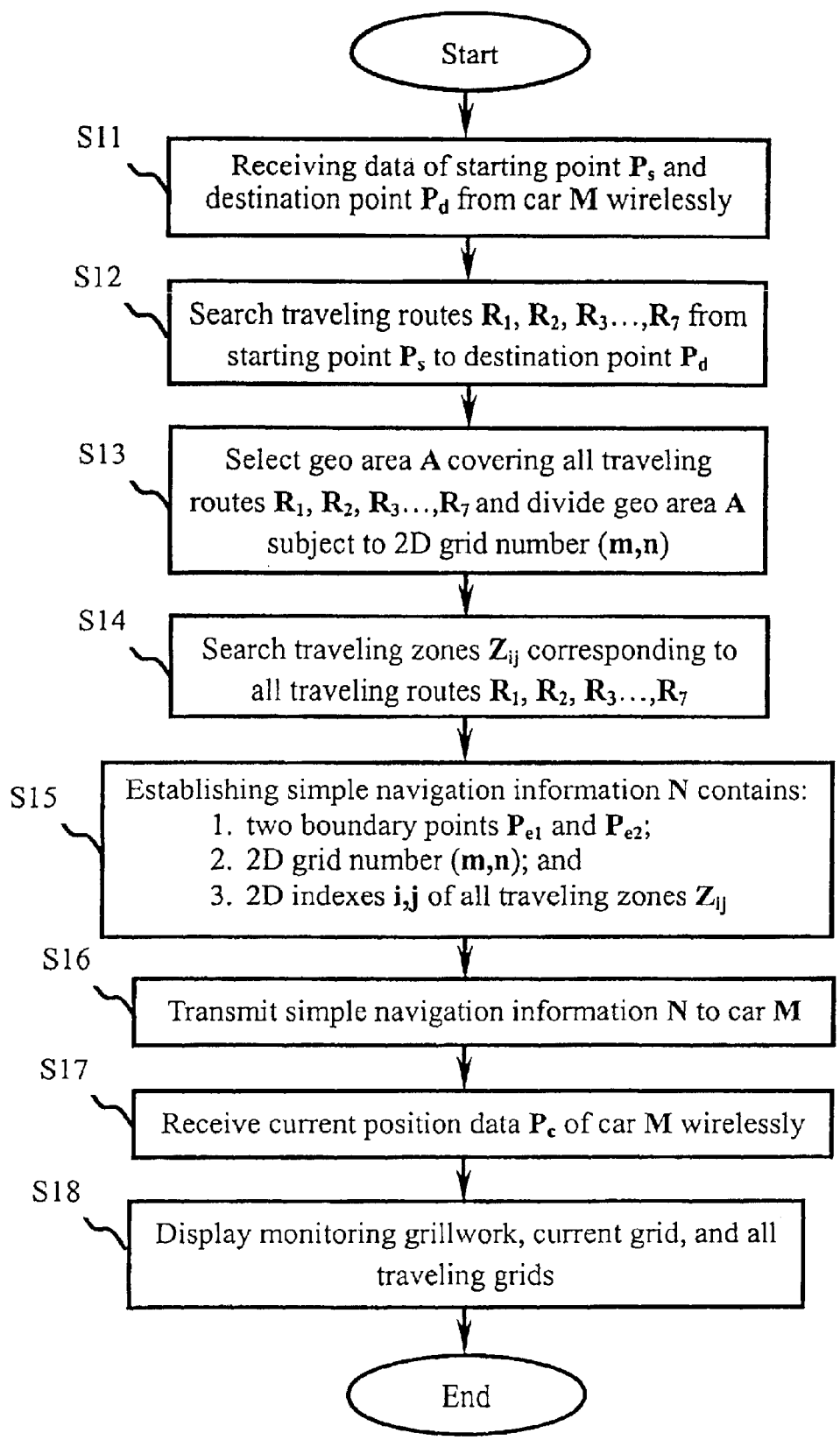
FIG. 2 is a flow chart explaining the operation of the remote consumer service center according to the present invention.

Referring to FIG. 2 and FIG. 1 again, the consumer service center S wirelessly receives a navigation request from a remote car M through the wireless communication device 32. The navigation request includes starting point data $P_s$ and destination point data $P_d$ (Step S11). Normally, the starting point data $P_s$ is the current GPS coordinates $P_s(X_s,Y_s)$ of the car directly retrieved from a GPS module 11 of the car M. Alternatively, the car driver can use an input device 16 (such as keyboard, touch screen, voice recognition device, . . . etc.) to manually input the name of the starting street or the intersection where the car is. Normally, the destination point data. $P_d$ is a voice sounds provided by the car driver to a serviceman of the consumer service center S through a wireless communication device 14 and 32, for enabling the serviceman of the consumer service center S to set the destination point coordinates $P_d(X_d,Y_d)$ into the server 3. Alternatively, the car driver can manually input the destination point coordinates $P_d(X_d,Y_d)$ through the aforesaid input device 16.

Figure 3:
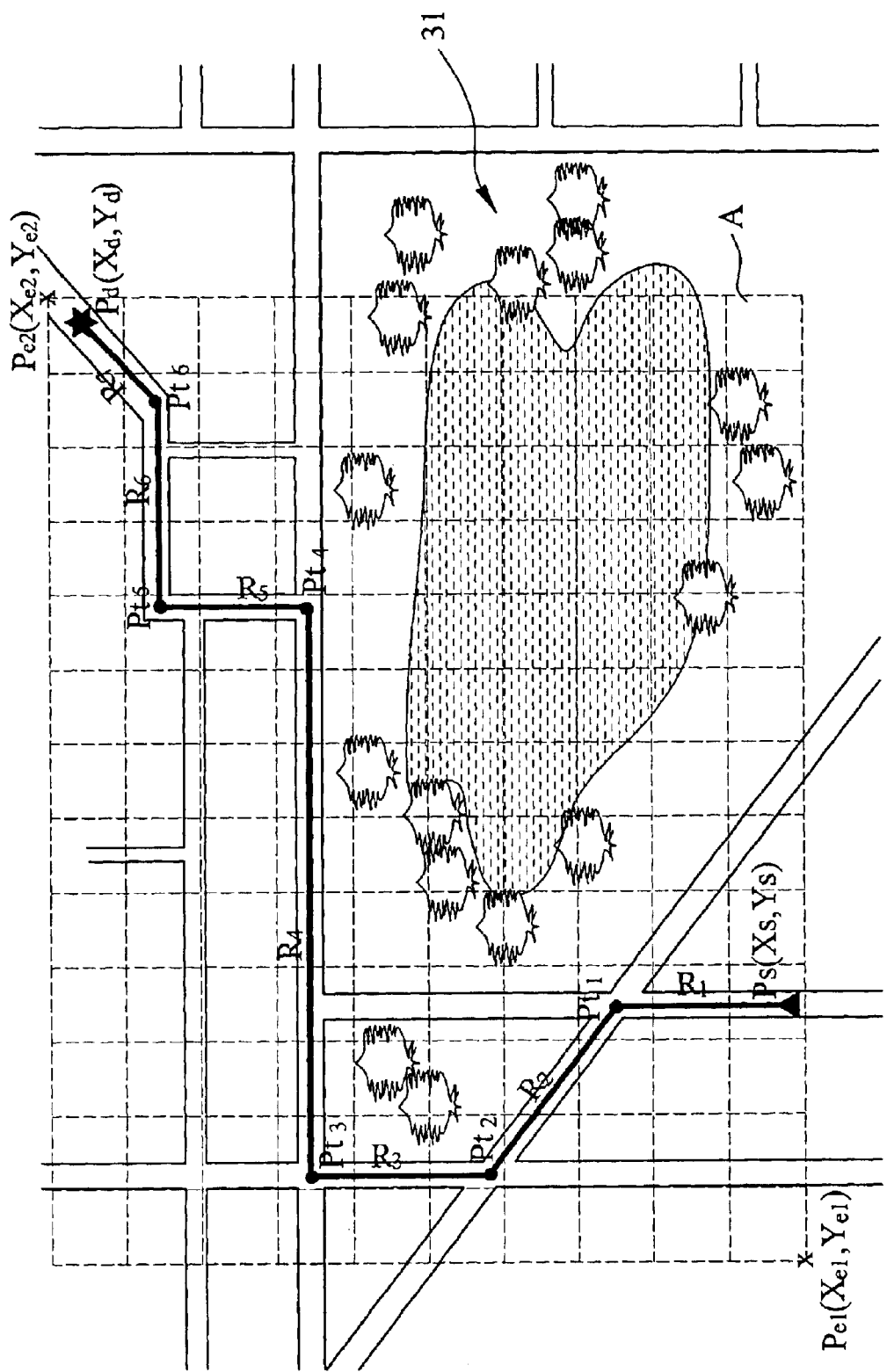
FIG. 3 is a schematic drawing showing an optimal traveling route according to the present invention.

Referring to FIG. 3 and FIGS. 1 and 2 again, the server 3 of the consumer service center S searches an optimal route including several traveling routes $R_1,R_2,R_3 \ldots, R_7$ and the related turning points $P_{t1},P_{t2},P_{t3}, \ldots P_{t6}$ from the electronic map database 31 based on the data of the starting point coordinates $P_s(X_s,Y_s)$ and the destination point coordinates $P_d(X_d,Y_d)$ (Step S12).

The server 3 selects from the electronic map database 31 a specific geo area A covering all the searched traveling routes $R_1,R_2,R_3 \ldots ,R_7$ (Step S13). As shown in FIG. 3, the specific geo area A is a rectangular area defined by the boundary coordinates $P_{e1}(X_{e1},Y_{e1})$ and $P_{e2}(X_{e2},Y_{e2})$ of the lower left corner and upper right corner in the longitude/latitude plane coordinate system of the earth, such that X coordinate values of traveling routes $R_1,R_2,R_3 \ldots ,R_7$ are between $X_{e1}$ and $X_{e2}$; Y coordinate values of traveling routes $R_1,R_2,R_3 \ldots ,R_7$ are between $Y_{e1}$ and $Y_{e2}$. Preferably, the specific geo area A covers the starting point coordinates $P_s(X_s,Y_s)$ in this embodiment.

Referring to FIG. 4 and FIG. 3 again, the server 3 divides the aforesaid specific geo area A into multiple geo zones $A_{ij}$ preferably in equal of m+1 columns and n+1 rows by a pair of predetermined 2D (two-dimensional) grid number (m,n), and defines a respective pair of 2D index i,j for every geo zone $A_{ij}$ subject to a 2D matrix array rule, in which i=0 . . . m, j=0 . . . n. The pair of predetermined 2D grid number (m,n) is a default value pre-stored in the memory 33 of server 3. In order to improve wireless transmission performance and to match later hexadecimal calculation, the pair of 2D grid number (m,n) are suggested to be 16×16 (i.e., (F, F)$_H$ in hexadecimal). According to this embodiment in FIG. 4, the pair of predetermined 2D grid number (m,n) is (C, 9)$_H$ in hexadecimal, i.e., having m+1=13 columns and n+1=10 rows. However, the server 3 may change the pair of predetermined 2D grid number (m,n) subject to actual requirements. For example, the server 3 has stored therein the equal side length of every geo zone $A_{ij}$, and divides the actual length and width of the selected specific geo area A by the equal side length so as to obtain respective integral multiples for the pair of 2D grid number (m,n). Alternatively, the server 3 may have pre-stored therein three different sizes of geo area A including 20 km$^2$, 40 km$^2$ and 80 km$^2$ each would be divided by a pair of predetermined 2D grid number (m,n) of fixed columns and fixed rows.

Figure 5:
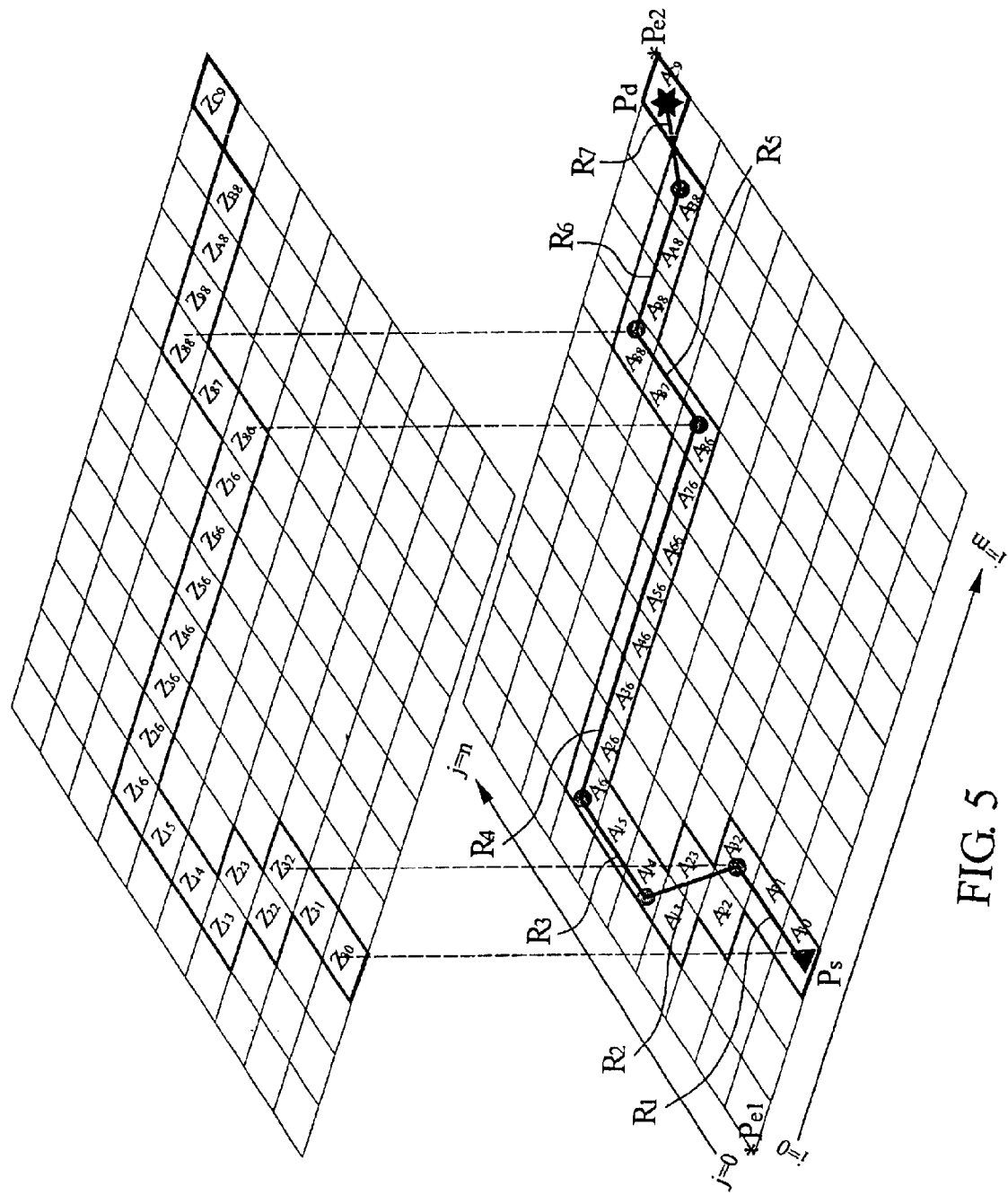
FIG. 5 is schematic drawing showing the traveling route corresponded to traveling zones according to the present invention.

FIG. 5 shows the server 3 compared the aforesaid traveling routes $R_1,R_2,R_3 \ldots ,R_7$ to geo zones $A_{ij}$ to find out multiple traveling zones $Z_{ij}$ corresponding to the geo zones $A_{ij}$ which include traveling routes $R_1,R_2,R_3 \ldots ,R_7$ therein (Step S14).

Thereafter, the server 3 assembles the aforesaid two boundary coordinates $P_{e1}(X_{e1},Y_{e1})$ and $P_{e2}(X_{e2},Y_{e2})$, the pair of predetermined 2D grid number (m,n), and the pairs of 2D indexes i,j of the traveling zones $Z_{ij}$ to establish a simple navigation information N (Step S15), and then stores such a navigation information N in the memory 33 for ready use. As illustrated in FIGS. 3~5, the simple navigation information N can be expressed by:

N=$$$(X_{e1},Y_{e1}),(X_{e2},Y_{e2}),(m,n), [30,31,32,22,23,13,14, 15,16,26,36,46,56,66,76,86,87,88,98,A8,B8,C9]$$

in which, the pairs of 2D indexes i,j of the traveling zones $Z_{ij}$ are all recorded in the simple navigation information N without any sorting arrangement. However, the aforesaid example is a preferable arrangement, which is in order from the starting point $P_s$ to the destination point $P_d$, or the reverse order, to prevent a repeat record of the pair of 2D index of turning point (for example, traveling zones $Z_{32}$, $Z_{16}$, $Z_{86}$, . . . etc.) and to shorten the length of the navigation information N.

The remote service center S immediately sends the aforesaid simple navigation information N with a short message to the wireless communication device 14 of the OBU (On-Board Unit) of the car M by the wireless communication device 32 (Step S16). According to the present preferred embodiment, the two wireless communication device 32 and 14 each comprise a GPRS (General Packet Radio Service) module for mutual transmitting and receiving data (for example, the aforesaid starting point coordinates $P_s(X_s,Y_s)$, destination point coordinates $P_d(X_d,Y_d)$, or simple navigation information N) wirelessly. Alternatively, a GSM (Groupe Speciale Mobile) module, 3C module, pager, or any of a variety of equivalent wireless communication modules may be used.

Figure 6:
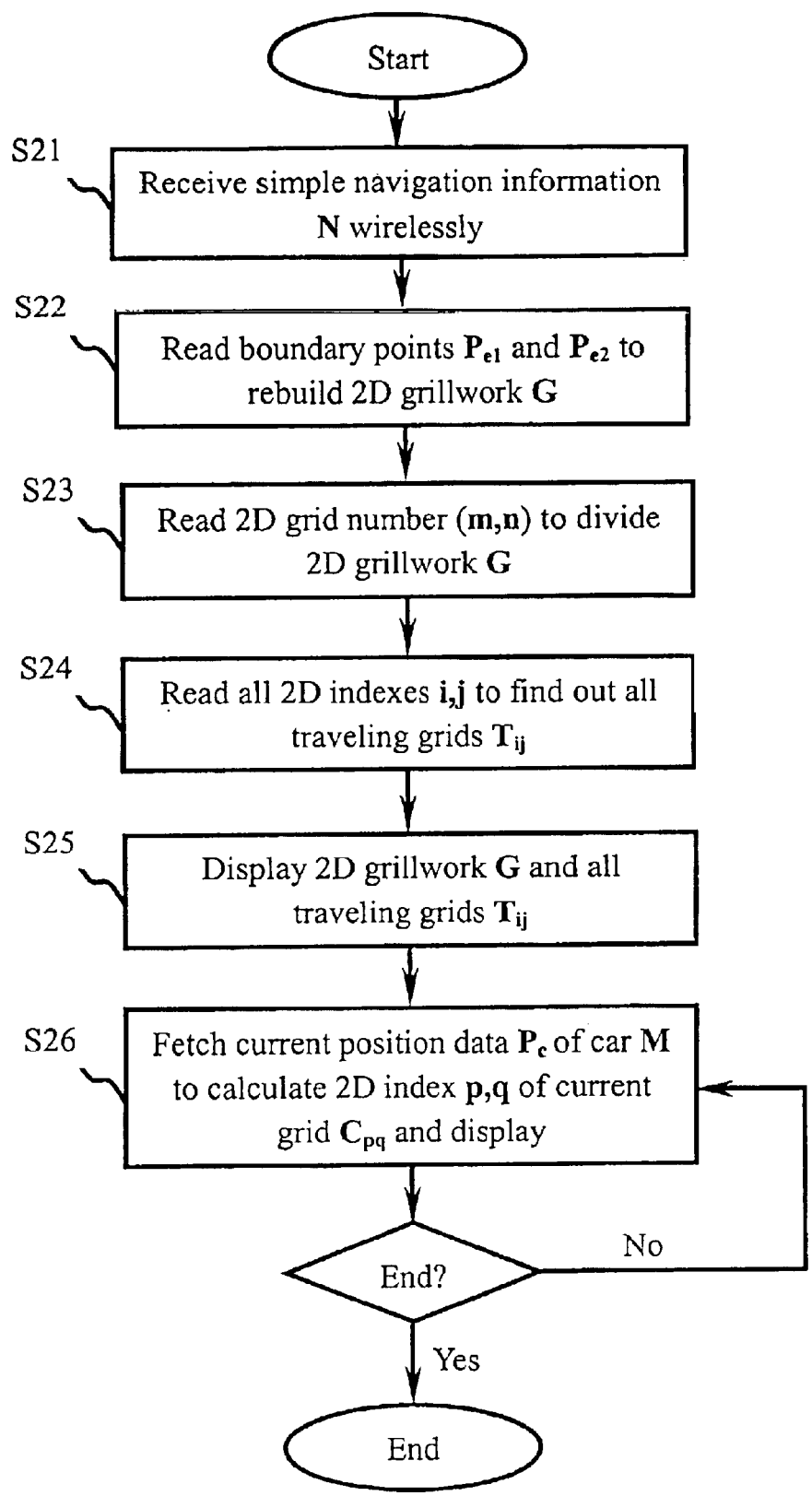
FIG. 6 is a flow chart explaining the operation of the On-Board Unit according to the present invention.

Referring to FIG. 6 and FIG. 1 again, when the wireless communication device 14 of the car M received the aforesaid simple navigation information N (Step S21), the processor 13 of the OBU of the car M first stores the navigation information N in a memory 12 for ready use.

Figure 7:
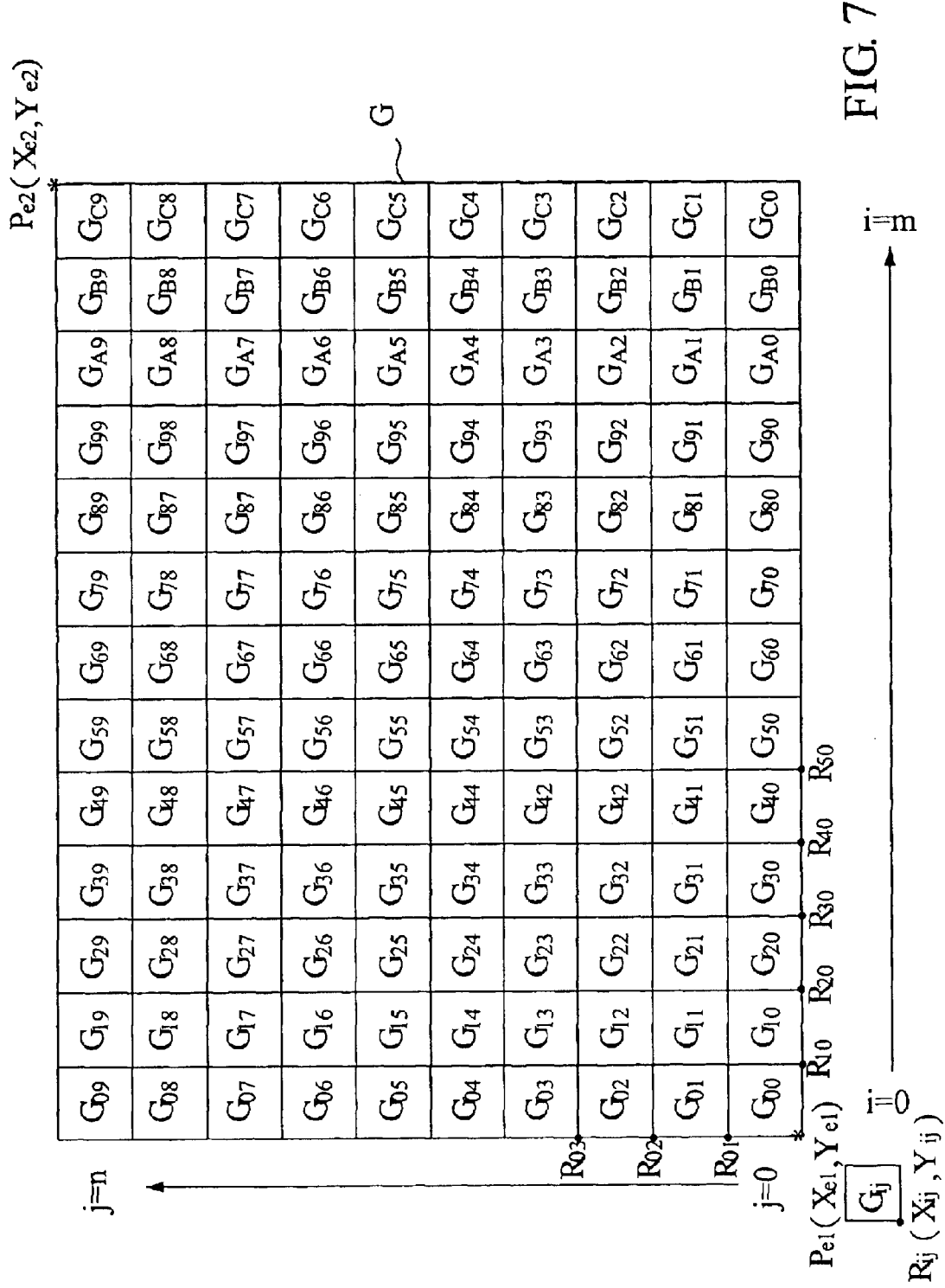
FIG. 7 is a schematic drawing showing the pairs of 2D indexes of 2D grids and their related reference points according to the present invention.

The processor 13 of the car M then starts to read in the two boundary coordinates $P_{e1}(X_{e1},Y_{e1})$ and $P_{e2}(X_{e2},Y_{e2})$ from the aforesaid simple navigation information N in the memory 12, and then uses the two boundary coordinates $P_{e1}(X_{e1},Y_{e1})$ and $P_{e2}(X_{e2},Y_{e2})$ as the lower left corner and upper right corner boundaries to rebuild a 2D grillwork G as shown in FIG. 7 (Step S22). Physically, the 2D grillwork G simulates and corresponds to the actual geo district of the aforesaid specific geo area A.

FIG. 7 shows the processor 13 further fetched the predetermined pair of 2D grid number (m,n) from the simple navigation information N in the memory 12, and equally divided the 2D grillwork G into multiple 2D grids $G_{ij}$ subject to the same aforesaid m+1 columns and n+1 rows (Step 523). The processor 13 further defines the 2D grids $G_{ij}$ each a respective pair of 2D index i,j subject to the same aforesaid 2D matrix array rule. The lower left corner of every 2D grid $G_{ij}$ is designated by the processor 13 as the reference point $R_{ij}(X_{ij},Y_{ij})$, i=0 ... m, j=0 ... n, in which:

$$X_{ij} = X_{e1} + i\frac{(X_{e2} - X_{e1})}{m+1} \quad Y_{ij} = Y_{e1} + j\frac{(Y_{e2} - Y_{e1})}{n+1}.$$

Physically, every 2D grid $G_{ij}$ simulates and corresponds to the actual geo district of one of the aforesaid geo zones $A_{ij}$.

Figure 8:
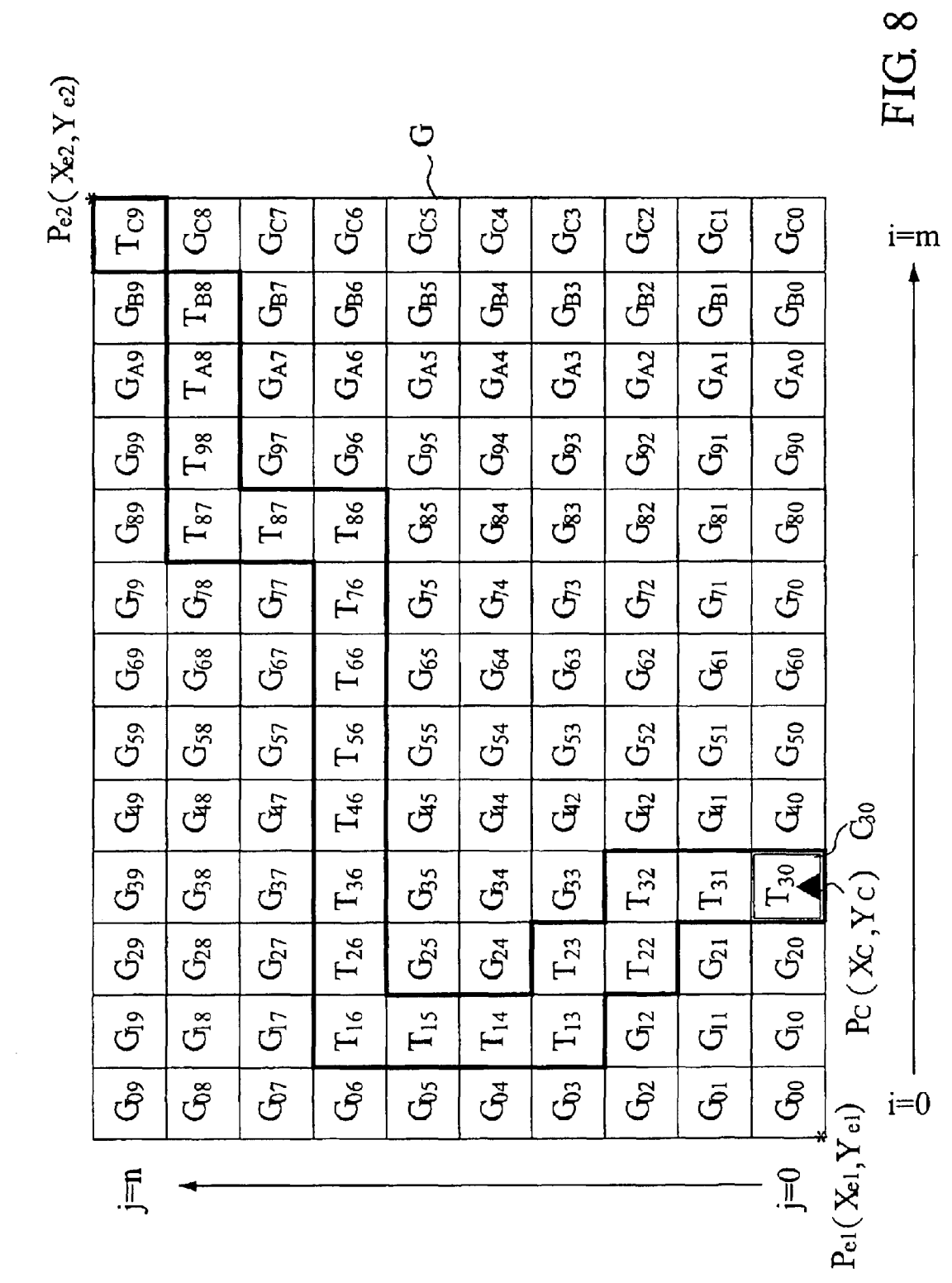

The processor 13 then fetches all the pairs of 2D indexes i,j from the simple navigation information N in the memory 12. FIG. 8 shows the processor 13 found out the corresponding multiple traveling grids $T_{ij}$ (Step S24) which having their pairs of 2D indexes same with those in the navigation information N. Physically, the traveling grids $T_{ij}$ correspond to the traveling zones $Z_{ij}$.

Figure 9:
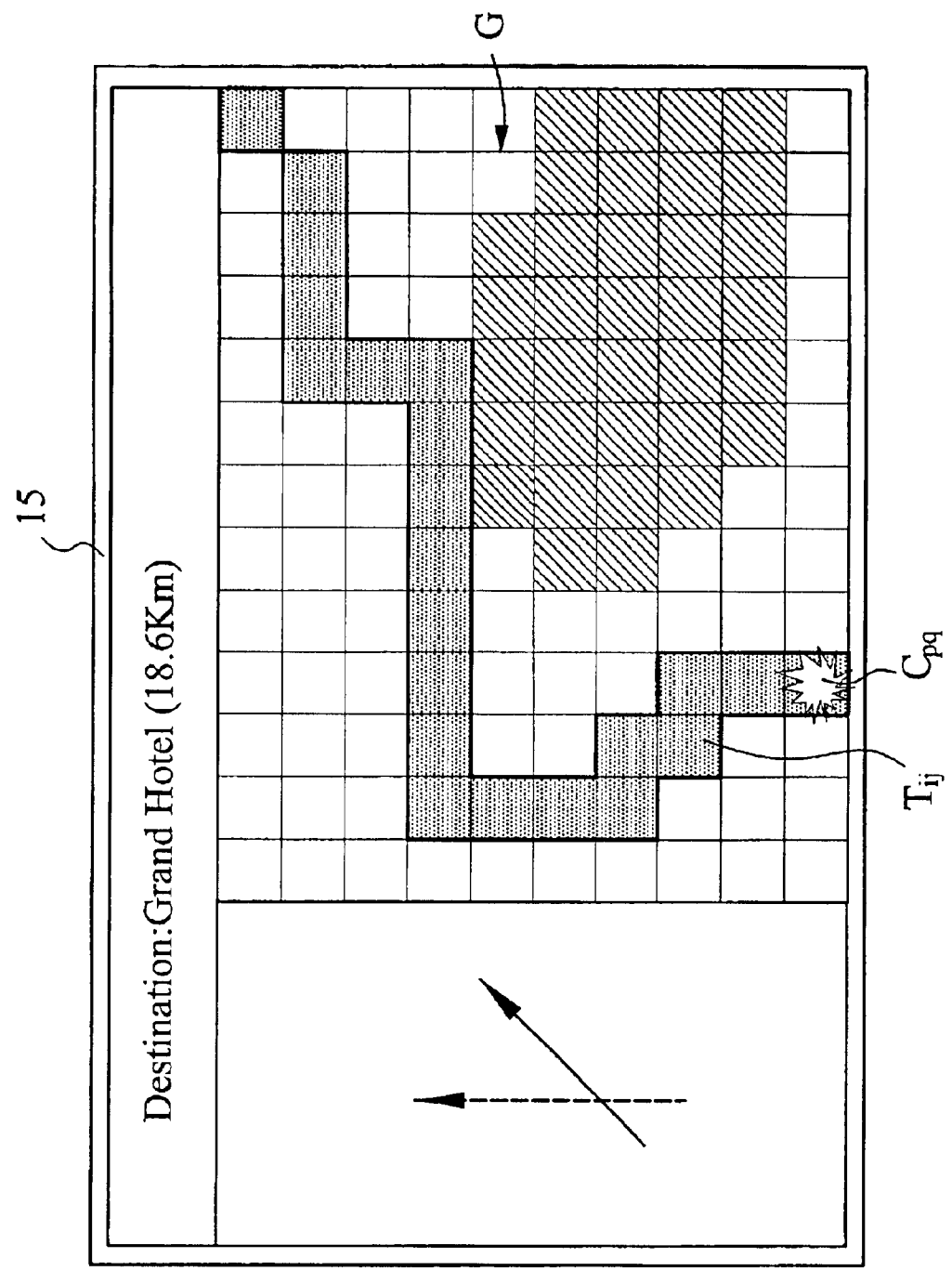
FIG. 9 illustrates an image shown on the display of the On-Board Unit according to the present invention.

The processor 13 is then displaying the aforesaid 2D grillwork G and all the corresponding traveling grids $T_{ij}$ on the output device (LCM display 15) as shown in FIG. 9 (Step S25), in which the corresponding traveling grids $T_{ij}$ are indicated by a relatively darker color.

Thereafter, when traveling, the processor 13 fetches the current position coordinates $P_c(X_c,Y_c)$ of the car M from the GPS module 11, and compares the fetched current GPS data to the reference points $R_{ij}(X_{ij},Y_{ij})$, so as to calculate the pair of 2D index p,q of a current grid $C_{pg}$ corresponding to the current position $P_c(X_c,Y_c)$ of the car M, and then display the current grid $C_{pg}$ on the display 15 as shown in FIG. 9 by blinking (Step S26). According to this example, presume $X_c$ is between $X_{ij}$ and $X_{(i+1)j}$, i.e., $X_{ij} \leq X_c \leq X_{(i+1)j}$, therefore when replacing $X_{ij}$ with $$X_{ij} = X_{e1} + i\frac{(X_{e2} - X_{e1})}{m+1}$$

into the equation, then $$X_{e1} + i\frac{(X_{e2} - X_{e1})}{m+1} \leq X_c < X_{e1} + (i+1)\frac{(X_{e2} - X_{e1})}{m+1},$$

when adjusted, $$i \leq (m+1)\frac{(X_c - X_{e1})}{(X_{e2} - X_{e1})} < (i+1),$$

therefore $$p = \left\lceil (m+1)\frac{(X_c - X_{e1})}{(X_{e2} - X_{e1})} \right\rceil,$$

which means taking the integral number part as to obtain the 2D index p.

In the same manner, the other 2D index q is obtained from the integral number part of $$q = \left\lceil (n+1)\frac{(Y_c - Y_{e1})}{(Y_{e2} - Y_{e1})} \right\rceil.$$

Based on the example shown in FIG. 8, presume the car M is departing from the starting point $P_s=P_c(X_c,Y_c)$ Therefore, the corresponding current grid $C_{pq}$ is $C_{30}$, and its pair of 2D index are p=3, and q=0 (hereinafter, the pair of 2D index is expressed by (p,q)=(3,0)). At this time, the display 15 on the car shows the content as indicated in FIG. 9, and the blinking current grid $C_{pq}$ is on one traveling grid $T_{ij}$, indicating the current position of the car M on the correct route. The driver simply needs to observe and figure out by himself the next traveling grid is the upper grid adjacent to the current grid $C_{pq}$ and then keep driving the car forwards.

According to this example, the processor 13 of the OBU of the car M needs not to convert complicated degree/minute/second of longitude/latitude coordinates of frequently received GPS data into second data, nor to compare the converted second data itself for searching the guiding direction. Therefore, the processor 13 can be simplified to a simplest structure so as to lower the cost. Further, the consumer service center S needs only to transmit the pair of 2D index i,j of every traveling zones $Z_{ij}$ to the car M wirelessly. Because the pair of index i,j of every traveling zones $Z_{ij}$ are simple hexadecimal two-bit digitals, the consumer service center S needs not to convert complicated degree/minute/second of longitude/latitude coordinates of the searched routes into second data as usual, nor to transmit the converted huge second data wirelessly. Therefore, the present invention can reduce the amount of wireless transmission data, and improve the wireless transmission accuracy.

Figure 10:
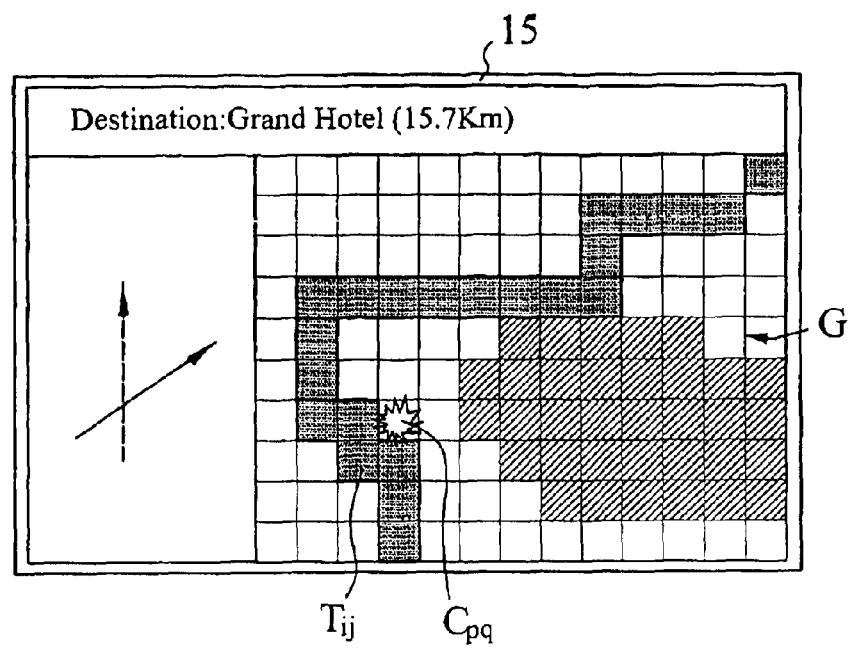
FIG. 10 illustrates an image shown on the display of the On-Board Unit when the car got lost.

Referring to FIG. 10, when the car M passed to a wrong way, the blinking current grid $C_{pq}$ is not within one of traveling grid $T_{ij}$. At this time, the driver can view the display 15 and figure out by himself the left grid is the nearest traveling grid $T_{ij}$ adjacent to the blinking current grid $C_{pq}$, and therefore the driver can turn the car M to the left trying to drive back to one of traveling grid $T_{ij}$.

Figure 11:
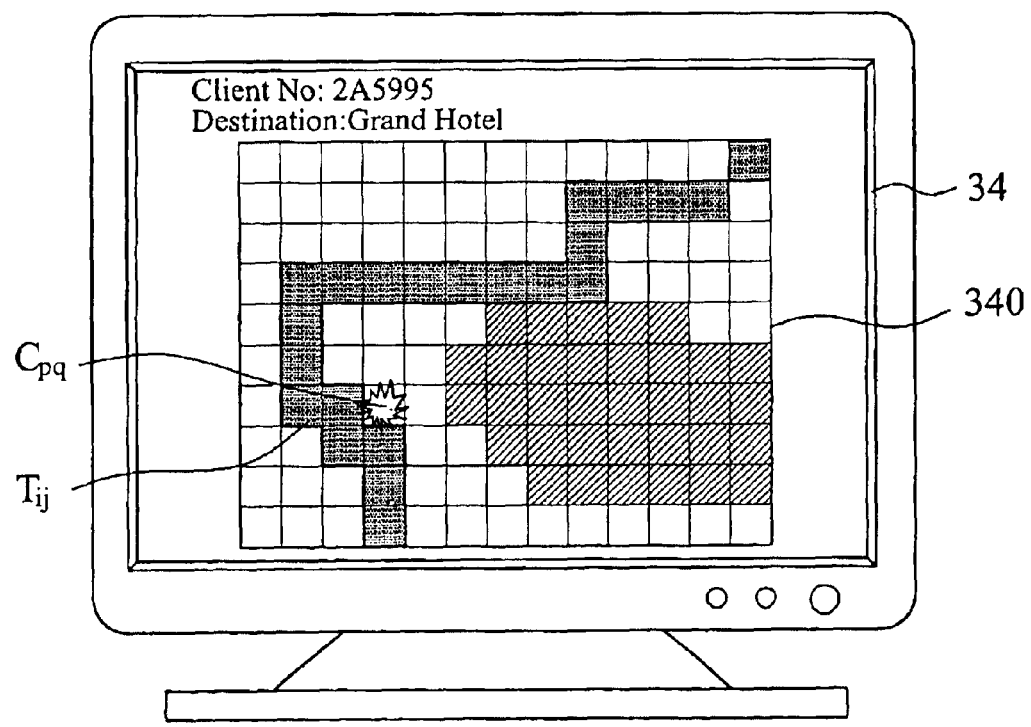
FIG. 11 illustrates an image synchronously shown on the display of the consumer service center when the car got lost.

If the car still got lost, the driver can dial up the wireless communication device 14 to connect to the consumer service center S, asking for an on-line navigating service. In this case, please refer to FIGS. 1, 2, 10 and 11, the driver uses the wireless communication device 14 to dial up the consumer service center S, and then to transmit the data of the current position coordinates $P_c(X_c,Y_c)$ and his identified license plate number of the car M to the consumer service center S wirelessly. After receipt of the above data with the wireless communication device 32 (Step S17), the server 3 fetches the corresponding simple navigation information N from the memory 33, and then follows the steps similar to the aforesaid Steps S22~S26 in FIG. 6 to rebuild and display a monitoring 2D grillwork 340, all the traveling grids $T_{ij}$, and the blinking current grid $C_{pq}$ on the display 34 (Step S18). FIG. 11 shows the monitoring 2D grillwork 340 has been evenly divided into multiple 2D grids subject to the same pair of predetermined 2D grid number (m,n) wherein said 2D grids each being respectively defined with a respective pair of 2D index subject to the same 2D matrix array rule used as in FIG. 7; the current grid $C_{pq}$ blinking in one 2D grip corresponding to the current position coordinates $P_c(X_c,Y_c)$ of the car M; and all the traveling grids $T_{ij}$ correspond to all the traveling zones $Z_{ij}$ and are indicated in relatively darker color.

Thus, the serviceman in the service center S can "synchronously" view from the display 34 the same image as displayed on the display 15 of the car M. Thereby, the serviceman can easily on-line guide the car M forwards to the destination by means of the mutual wireless communication. Preferably, the serviceman can further accompany with the content of electronic map database 31 (see FIG. 3) to provide a more detail and more accurate on-line navigating service.

In order to match with the status of current GPS signal transmitted from a conventional global positioning satellite 9 is based on the geographical longitude/latitude plane coordinates system of the earth, every procedure of the present invention is designed subject to the geographical longitude/latitude plane coordinates system of the earth. Alternatively, other rectangular coordinate system, mitered plane coordinate system, or radius-angle (Rθ) coordinate system may be used as a substitute under the condition that the remote consumer service center S and the car M use the same coordinates system.

The boundary points of the simple navigation information N are not limited to the aforesaid example. Alternatively, it is workable to select the upper left corner and the lower right corner, the upper left corner and the upper right corner with a fixed latitude width, the lower left corner and the lower right corner with a fixed latitude width, three of the four corners, or the four corners for defining the specific geo area. It can also use any of a variety of other position parameters to define the specific geo area.

The 2D index i,j of every 2D grid $G_{ij}$ and every geo zone $A_{ij}$ can be indexed subject to other type of 2D array rule instead of the above 2D matrix array rule. Instead of the first pair of 2D index (0,0) shown in FIG. 4, any other grid can be designated as the first grid and then the other pair of 2D index is increased progressively (or reduced progressively). The progressively increased amount (or progressively reduced amount) can be 2,3,4 . . . etc. Further, any other initial value can be used for the first pair of 2D index instead of (0,0).

The remote server 3 may further search the electronic map database 31 for rivers, lakes, mountains, crags, and other natural barrier areas or dangerous areas, or traffic jam segments (for example, the lake area shown in FIG. 3 and the corresponding slash barrier area shown in FIG. 10), and then transmit the related pairs of 2D indexes i,j of the barrier area together with the simple navigation information N to the car M wirelessly, informing the driver of the car M to keep away from the barrier areas. This measure is very important for a car M that does not have a precision navigation system on board, and relies upon the navigation guidance provided by a remote server. It prevents the car M from entering a dangerous way, and dispels driving scotoma.

Actually, every operation step of the consumer service center S can be achieved manually by a serviceman without through the automatic server.

Although the present invention has been explained in relation to its preferred embodiments, it is to be understood that many other possible modifications and variations can be made without departing from the spirit and scope of the invention as hereinafter claimed.

What is claimed is:

1. A vehicle navigation method used in a consumer service center, the vehicle navigation method comprising the steps in series of:
  (A) receiving the position data of a starting point and the position data of a destination point;
  (B) searching at least one traveling route from said starting point to said destination point;
  (C) selecting a geo area covering said at least one traveling route, in which said geo area is defined by at least two position parameters and divided into a plurality of geo zones subject to a pair of predetermined 2D (two-dimensional) grid number, said geo zones each being respectively defined with a respective pair of 2D (two-dimensional) index subject to a 2D (two-dimensional) array rule;
  (D) searching multiple traveling zones corresponding to the geo zones which including said at least one traveling route therein;
  (E) establishing a simple navigation information, said simple navigation information comprising said at least two position parameters, said pair of predetermined 2D grid number, and the pairs of 2D indexes of said traveling zones; and
  (F) transmitting said simple navigation information to a car.

2. The vehicle navigation method as claimed in claim 1, further comprising the steps of:
  (G) receiving from said car the current position data of said car; and
  (H) displaying a monitoring 2D (two-dimensional) grillwork on a display, in which said monitoring 2D grillwork being divided into a plurality of 2D (two-dimensional) grids subject to said pair of predetermined 2D grid number wherein said 2D grids each being respectively defined with a respective pair of 2D (two-dimensional) index subject to said 2D array rule, displaying a plurality of traveling grids in said monitoring 2D grillwork corresponding to the 2D grids having their pairs of 2D indexes same with those of said traveling zones, and displaying a current grid in said monitoring 2D grillwork corresponding to the 2D grid of the current position of said car.

3. The vehicle navigation method as claimed in claim 2, further comprising the step of (I) enabling said consumer service center to connect to said car through a wireless communication device and then to guide said car moving forward.

4. The vehicle navigation method as claimed in claim 1, wherein said consumer service center has installed therein a wireless communication device for transmitting said simple navigation information to said car wirelessly in Step (F).

5. The vehicle navigation method as claimed in claim 4, wherein said wireless communication device is a GPRS (General Packet Radio Service) module.

6. The vehicle navigation method as claimed in claim 1, wherein said at least two position parameters in Step (C) are the position coordinates of at least two boundary points in a rectangular plane coordinates system; said geo area is defined by the position coordinates of said at least two boundary points and divided into said geo zones by said pair of predetermined 2D grid number subject to said rectangular plane coordinates system.

7. The vehicle navigation method as claimed in claim 6, wherein said rectangular plane coordinates system is the longitude/latitude plane coordinate systems of the earth.

8. The vehicle navigation method as claimed in claim 1, wherein the pairs of 2D indexes of said geo zones in Step (C) are defined subject to a 2D (two-dimensional) matrix array rule.

9. The vehicle navigation method as claimed in claim 1, wherein said consumer service center has installed therein a server and an electronic map database linked to said server.

10. The vehicle navigation method as claimed in claim 1, wherein said consumer service center has installed therein a memory, and said simple navigation information in Step (E) is stored in said memory.

11. A vehicle navigation system installed in a car, comprising:

a GPS (global positioning system) module adapted to calculate the current position data of said car;

memory means, said memory means having stored therein a simple navigation information which comprising at least two position parameters, a pair of predetermined 2D (two-dimensional) grid number, and multiple pairs of 2D (two-dimensional) indexes;

processor means adapted to read said at least two position parameters from said memory means and to define a 2D (two-dimensional) grillwork by means of said at least two position parameters, to read said pair of predetermined 2D grid number from said memory means and to divide said 2D grillwork into a plurality of 2D (two-dimensional) grids each having a respective reference point position and a respective pair of 2D index defined subject to a 2D (two-dimensional) array rule, to fetch the current position data of said car from said GPS module and to compare the current position data of said car to the reference point positions of said 2D grids so as to calculate the pair of 2D index of a current grid corresponding to the current position of said car; and output means adapted to display said 2D grillwork, said current grid, and a plurality of traveling grids having their pairs of 2D indexes same with the pairs of 2D indexes stored in said memory means.

12. The vehicle navigation system installed in a car as claimed in claim 11, further comprising a wireless communication device adapted to communicate with a remote consumer service center wirelessly.

13. The vehicle navigation system installed in a car as claimed in claim 12, wherein said car is wirelessly connected to said remote consumer service center through said wireless communication device to receive said simple navigation information from said remote consumer service center.

14. The vehicle navigation system installed in a car as claimed in claim 12, wherein said wireless communication device is a GPRS (General Packet Radio Service) module.

15. The vehicle navigation system installed in a car as claimed in claim 11, wherein the pairs of 2D indexes of said 2D grids are defined subject to a 2D (two-dimensional) matrix array rule.

16. The vehicle navigation system installed in a car as claimed in claim 11, wherein said at least two position parameters are the position coordinates of at least two boundary points in a rectangular plane coordinates system; said processor means uses the position coordinates of said at least two boundary points to define said 2D grillwork, and divides said 2D grillwork into said 2D grids by said pair of predetermined 2D grid number subject to said rectangular plane coordinates system.

17. The vehicle navigation system installed in a car as claimed in claim 16, wherein said rectangular plane coordinates system is the longitude/latitude plane coordinates system of the earth.

18. The vehicle navigation system installed in a car as claimed in claim 16, wherein the position coordinates of said at least two boundary points include $P_{e1}(X_{e1},Y_{e1})$ and $P_{e2}(X_{e2},Y_{e2})$ respectively defined as the lower left corner and upper right corner of said 2D grillwork, and the coordinates of the reference point positions of said 2D grids $R_{ij}(X_{ij},Y_{ij})$, i=0 . . . m, j=0 . . . n define the lower left corner of the respective 2D grids and have the relationship of:

$$X_{ij} = X_{e1} + i\frac{(X_{e2} - X_{e1})}{m+1} \text{ and } Y_{ij} = Y_{e1} + j\frac{(Y_{e2} - Y_{e1})}{n+1}, \text{ and}$$

said processor means calculate the pair of 2D index p,q of the current grid $C_{pq}$ corresponding to the current position coordinates $P_c(X_c,Y_c)$ of said car subject to the equations of $$p = \left\lceil (m+1)\frac{(Xc - X_{e1})}{(X_{e2} - X_{e1})} \right\rceil, \text{ and } q = \left\lceil (n+1)\frac{(Yc - Y_{e1})}{(Y_{e2} - Y_{e1})} \right\rceil.$$

* * * * *